(12) United States Patent
Harrison

(10) Patent No.: US 9,446,746 B2
(45) Date of Patent: Sep. 20, 2016

(54) METHOD OF VEHICLE STABILITY CONTROL

(71) Applicant: Haldex Brake Products Limited, Nuneaton Warwickshire (GB)

(72) Inventor: Dudley John Harrison, Solihull (GB)

(73) Assignee: Haldex Brake Products Limited, Nuneaton Warwichshire (GB)

( * ) Notice: Subject to any disclaimer, the term of this patent is extended or adjusted under 35 U.S.C. 154(b) by 0 days.

(21) Appl. No.: 14/373,802

(22) PCT Filed: Feb. 12, 2013

(86) PCT No.: PCT/GB2013/050319
§ 371 (c)(1),
(2) Date: Jul. 22, 2014

(87) PCT Pub. No.: WO2013/121188
PCT Pub. Date: Aug. 22, 2013

(65) Prior Publication Data
US 2014/0358395 A1    Dec. 4, 2014

(30) Foreign Application Priority Data
Feb. 17, 2012    (GB) .................................... 1202766.0

(51) Int. Cl.
*B60T 8/1755*    (2006.01)
*B60T 8/17*    (2006.01)

(52) U.S. Cl.
CPC .......... *B60T 8/1708* (2013.01); *B60T 8/17554* (2013.01); *B60T 2201/16* (2013.01); *B60T 2230/03* (2013.01); *B60T 2230/06* (2013.01); *B60T 2240/06* (2013.01)

(58) Field of Classification Search
None
See application file for complete search history.

(56) References Cited

U.S. PATENT DOCUMENTS

| | | | | |
|---|---|---|---|---|
| 5,487,598 | A | * | 1/1996 | Rivard .................... B60T 8/445 303/119.1 |
| 2001/0037677 | A1 | | 11/2001 | Holst et al. |
| 2002/0180265 | A1 | * | 12/2002 | Jokic ..................... B60T 8/1755 303/146 |
| 2003/0225499 | A1 | * | 12/2003 | Holler ................. B60R 21/0132 701/71 |
| 2004/0183372 | A1 | * | 9/2004 | Heuer .................... B60T 8/1708 303/123 |
| 2005/0137767 | A1 | * | 6/2005 | Goebels .............. B60R 16/0233 701/38 |
| 2008/0288148 | A1 | * | 11/2008 | Amato ................... B60T 8/1708 701/70 |
| 2010/0211283 | A1 | * | 8/2010 | Harrison ............. B60T 8/17554 701/72 |
| 2012/0193889 | A1 | * | 8/2012 | Harrison ................... B60T 7/20 280/423.1 |

FOREIGN PATENT DOCUMENTS

| | | |
|---|---|---|
| EP | 1 142 768 | 10/2001 |
| GB | 2475528 | 5/2011 |
| WO | 02/22416 | 3/2002 |

OTHER PUBLICATIONS

International Search Report dated May 21, 2013, International Application No. PCT/GB2013/050319.

* cited by examiner

*Primary Examiner* — John R Olszewski
*Assistant Examiner* — Jess Whittington
(74) *Attorney, Agent, or Firm* — Young Basile Hanlon & MacFarlane P.C.

(57) ABSTRACT

A method of vehicle stability control including the steps of: a) applying a test braking pulse to a wheel on a first side of the vehicle and to a wheel on a second, opposite, side of the vehicle, b) measuring the rotational speed of both wheels during the test braking pulse, c) calculating a change in wheel speed during the test braking pulse for each wheel, d) calculating the difference between the change in speed of the wheels, e) carrying out a stability control intervention if the difference exceeds a predetermined threshold, f)ceasing the test braking pulse if the difference over the first period of times is less than a predetermined level, and g) continuing the test braking pulse for a second period of time if the difference over the first period of time is greater than the predetermined level.

14 Claims, 4 Drawing Sheets

METHOD OF VEHICLE STABILITY CONTROL

CROSS-REFERENCE TO RELATED APPLICATIONS

Figure 1:
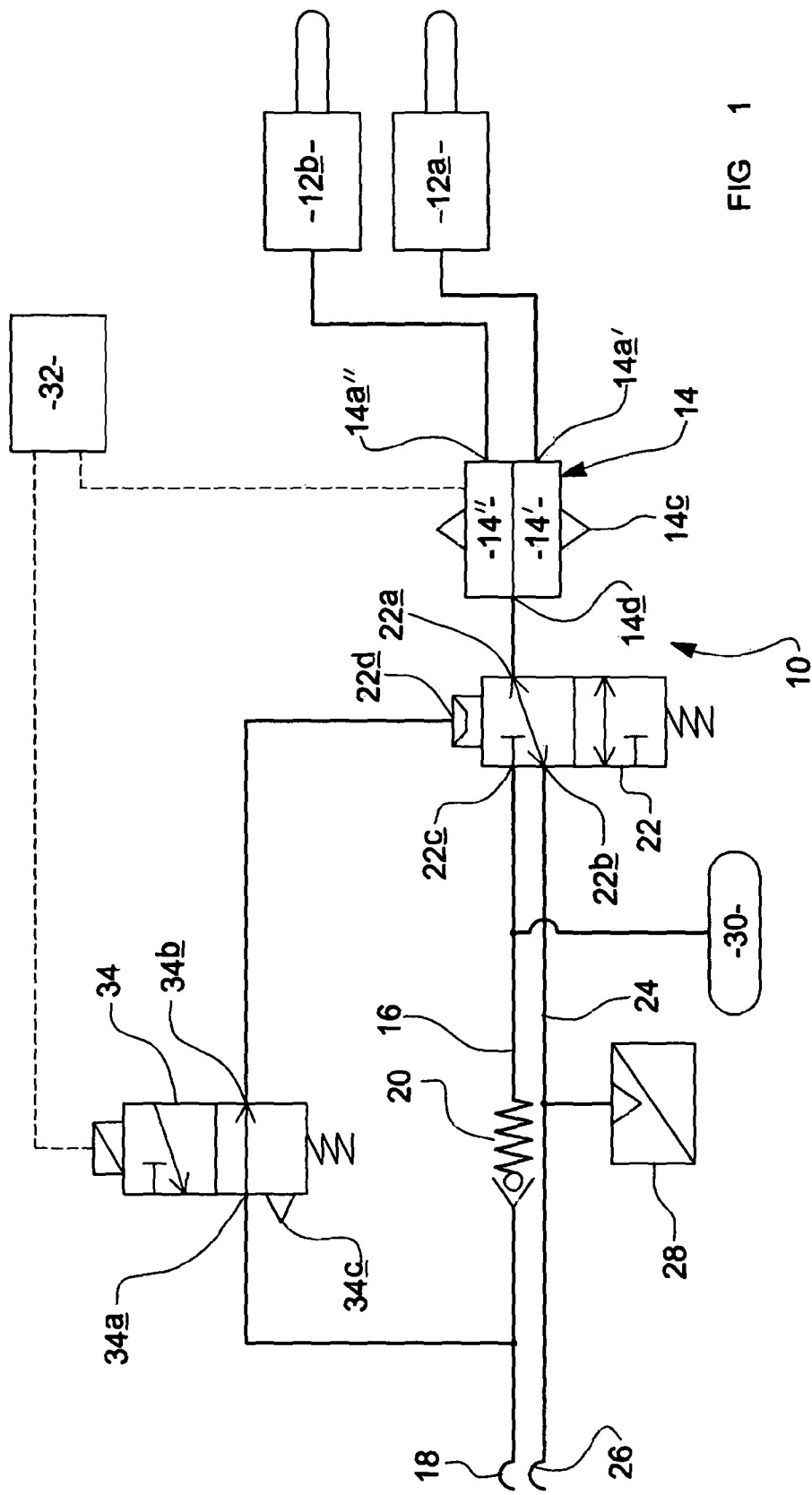

This application is the national stage application of, and claims priority to, International Application No. PCT/GB2013/050319 filed Feb. 17, 2013, which was published in the English language on Aug. 22, 2013 as International Publication No. WO 2013/121188. International Application No. PCT/GB2013/050319 claims the benefit of United Kingdom Patent Application No. 1202766.0 filed Feb. 17, 2012.

DESCRIPTION OF INVENTION

The present invention relates to a method of vehicle stability control, particularly, but not exclusively for use in an anti-lock braking system (ABS) of a trailer of a road vehicle comprising a tractor and trailer combination.

When a vehicle, in particular a heavy goods vehicle, rounds a corner, if the speed of the vehicle is sufficiently high, forces on the vehicle during cornering can cause the vehicle wheels on the inside of the curve travelled by the vehicle to lift off the road. Under certain conditions, this can cause the vehicle to overturn. It is therefore known to provide an automatic stability control system which acts to apply the vehicle brakes, and/or control the engine throttle to reduce the speed of the vehicle, when wheel lift is detected, in order to minimise the risk of rollover.

One such system, for commercial vehicles including tractor and trailer combinations, is disclosed in US2007/0138865. This system is specifically described in relation to single pressure channel electronic braking system in which a single brake application modulator serves the vehicle wheels on both sides of the vehicle. In this prior art system, when it is determined that a situation with potential for rollover exists, for example by monitoring the lateral acceleration of the vehicle, a low-level brake test pulse is applied to all the wheels controlled by the modulator, i.e. wheels on both sides of the vehicle, and the wheel speed of at least one wheel on the inside of the turn is then monitored. The wheel speed behaviour of the wheel or wheels on the inside of the turn is used to determine if wheel lift has occurred, and, if it has, a stability control intervention is initiated. Another similar system is disclosed in US2004/0183372. This system compares the wheel speed with the ground speed for wheels braked by the test braking pulse, and wheel slip is noted if there is any significant deviation between the variation of wheel speed from the variation in ground speed. A stability control intervention is initiated if the slip exceeds a predetermined threshold.

Prior art stability control systems such as the systems described above, in which the stability control intervention comprises the automatic application of the vehicle brakes, are normally implemented only in vehicles with electronic braking systems (EBS), as such systems provide for electronically controlled application of the vehicle brakes. Commercial vehicles with an anti-lock braking system (ABS) but without EBS have not generally been provided with such stability control systems, as the ABS provides electronically controlled release and holding of the braking pressure but typically does not provide the means for electronically initiated application of the vehicle brakes, for which additional components would be necessary.

In our co-pending UK patent application number 1109730.0 we describe how a vehicle with ABS may be modified by the addition of an electrically operable brake apply valve. This valve can be electronically controlled to apply the vehicle brakes in the absence of driver demand for braking, just as is required in the stability control systems described above. It is an object of the present invention to provide a method of operating a vehicle stability control system which is particularly suitable for use in the modified ABS shown in this co-pending UK application.

According to a first aspect of the invention we provide a method of vehicle stability control including the steps of:

a) applying a test braking pulse to a wheel on a first side of the vehicle and to a wheel on a second, opposite, side of the vehicle, the application of the test braking pulse comprising operating a brake actuator to apply a low level braking pressure to the wheel, b) measuring the rotational speed of both wheels during the test braking pulse, c) calculating a change in wheel speed during the test braking pulse for each wheel, d) calculating the difference between the change in speed of the wheel at the first side of the vehicle and the change in speed of the wheel at the second side of the vehicle, e) carrying out a stability control intervention if the said difference exceeds a predetermined threshold.

By test braking pulse we mean a low level braking force which is significantly lower than the normal braking force applied during driver demand for braking and which is not intended to have a significant effect on the vehicle speed.

In one embodiment of the invention, the method further comprises measuring the lateral acceleration of the vehicle, and carrying out the steps a to e of the method if the lateral acceleration of the vehicle exceeds a predetermined threshold.

The stability control intervention may comprise applying a controlled braking force to one or more of the wheels on the outside of the vehicle's turning curve.

The method may comprise measuring the lateral acceleration of the vehicle and ceasing the braking stability control intervention when the lateral acceleration of the vehicle falls below a predetermined threshold.

The method may comprise the steps of monitoring the braking system to detect if there is driver demand for braking during the test braking pulse, determining the level of braking demanded, comparing this with the level of braking applied as the test braking pulse, and, if the level of braking demanded exceeds the test braking level, increasing the level of braking applied to meet the level demanded.

The method may comprise the steps of monitoring the braking system to detect if there is driver demand for braking, and if there is driver demand for braking during the stability control intervention, determining the level of braking demanded, comparing this with the level of braking applied as the stability control intervention, and, if the level of braking demanded exceeds the level applied in the stability control intervention, applying the demanded level of braking pressure to all wheels of the vehicle.

The method may comprise calculating the difference between the change in speed of the wheel at the first side of the vehicle and the change in speed of the wheel at the second side of the vehicle from the start of the test braking pulse for a first period of time, and ceasing the test braking pulse if the difference over the first period of time is less than a predetermined level, or continuing with the test braking pulse for a second period of time if the difference over the first period of time is greater than a predetermined level.

Where the test braking pulse is continued for the second period of time, the difference used in step e of the method is preferably the difference between the change in speed of the wheel at the first side of the vehicle and the change in speed of the wheel at the second side of the vehicle over the first and second periods of time.

According to a second aspect of the invention we provide an electronic braking controller which is programmed to implement the method of the first aspect of the invention.

Figure 2:
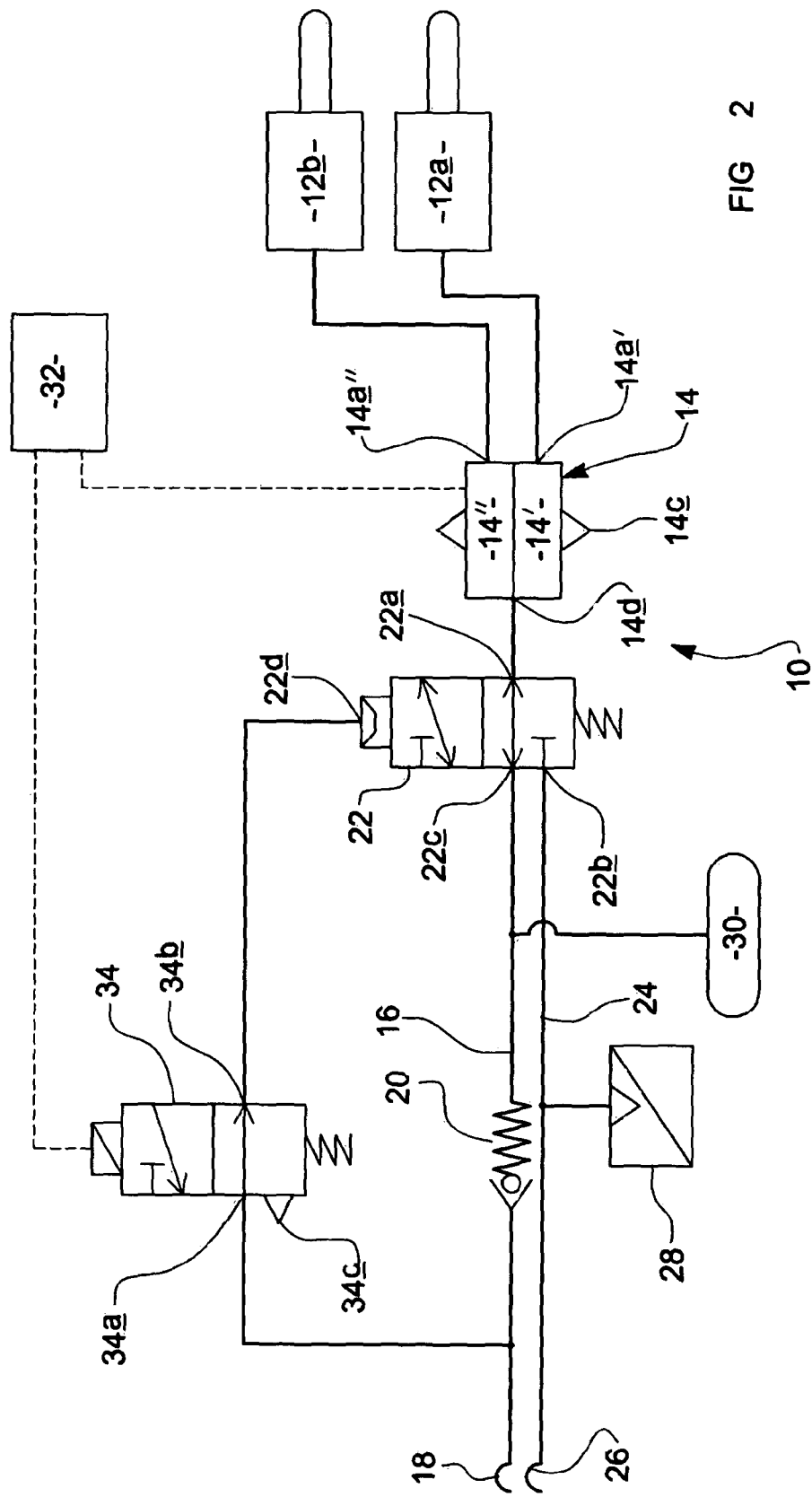
Figure 3:
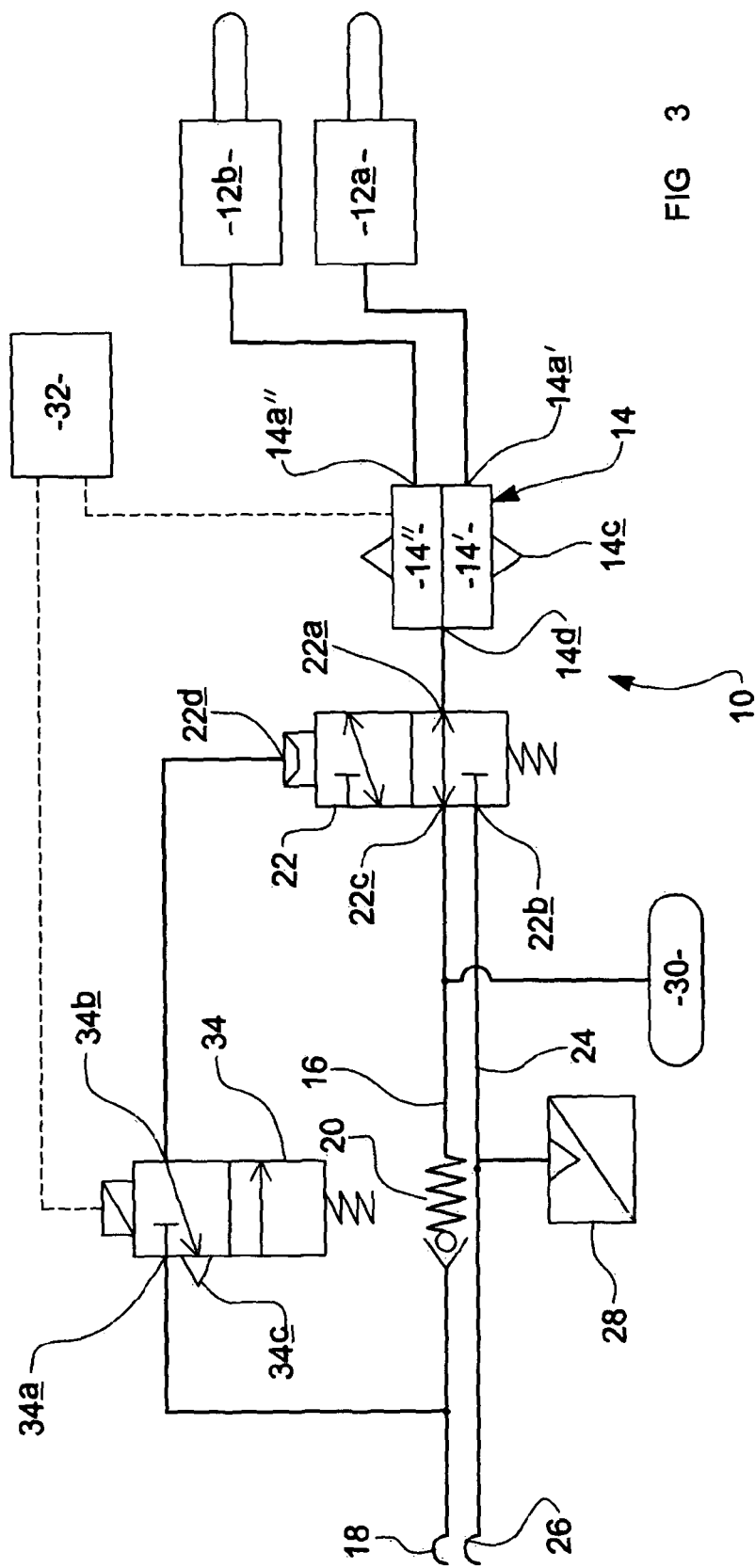
Figure 4:
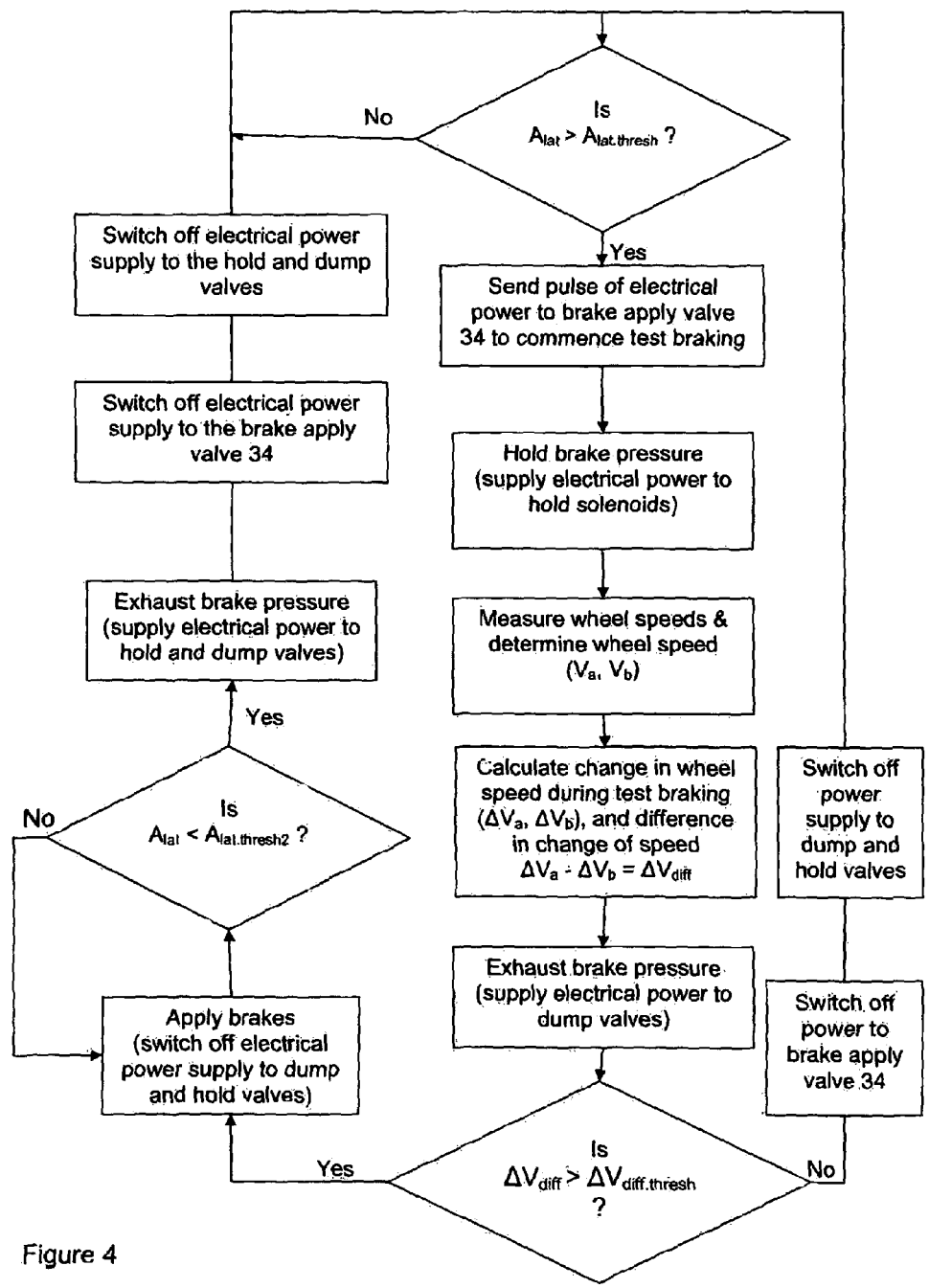

Various embodiments of the invention will now be described, by way of example only, with reference to the accompanying figures of which, FIG. 1 shows a schematic illustration of a trailer braking system suitable for use with a method of vehicle stability control in accordance with the invention, the trailer braking system being in the normal braking configuration, FIG. 2 shows a schematic illustration of the trailer braking system suitable for use with a method of vehicle stability control in accordance with the invention, the trailer braking system being in the emergency braking configuration, FIG. 3 shows a schematic illustration of the trailer braking system suitable for use with a method of vehicle stability control in accordance with the invention, the trailer braking system being in the electronic braking configuration, and FIG. 4 shows a flow chart illustrating a method of vehicle stability control according to the invention.

Referring now to the figures, there is shown a trailer braking system 10 which has two service brake actuators 12a,12b, a modulator valve assembly 14, a supply line 16, a supply connector 18, a non-return valve 20, an emergency apply valve 22, a control line 24, a control connector 26, a pressure transducer 28, a trailer pressurised fluid reservoir 30, and a braking ECU (electronic control unit) 32.

The first service brake actuator 12a is operable to apply a braking force to a wheel at a first side of the vehicle, and the second service brake actuator 12b is operable to apply a braking force to a wheel at a second side of the vehicle. Although in this example, only two service brake actuators are shown, it should be appreciated that more may be provided.

The service brake actuators 12a, 12b are each connected to a delivery port 14a', 14a" of braking control valve assembly, which in this embodiment of the invention is an anti-lock braking system (ABS) modulator valve assembly 14 comprising two modulators 14', 14". In addition to the two delivery ports 14a' 14a", the modulator valve assembly 14 has an exhaust port 14c which is connected to a low pressure region (typically the atmosphere), and a control port 14d.

The control port 14d is connected to the outlet 22a of a pilot operated emergency apply valve 22. In addition to the outlet 22a, the emergency apply valve 22 has a first inlet 22b, a second inlet 22c, and a control port 22d, the first inlet 22b being connected to a control line 24, the second inlet 22c and the control port 22d being connected to a supply line 16. The emergency apply valve 22 is a two position valve which is movable between a first position (illustrated in FIG. 1) in which the first inlet 22b is connected to the outlet 22a whilst the second inlet 22c is closed, and a second position (illustrated in FIGS. 2 and 3) in which the first inlet 22b is closed whilst the second inlet 22c is connected to the outlet 22a. The emergency apply valve 22 is provided with resilient biasing means (a spring) which urges it to the second position, and will move to the first position when the fluid pressure at the control port 22d is sufficient to overcome the biasing force of the spring.

The supply line 16 is, in use, connected to a source of pressurised fluid (typically compressed air). When the trailer is pulled by a towing vehicle (tractor) the source of pressurised fluid is typically provided on the tractor, so the supply line 16 extends to a pneumatic or hydraulic supply connector 18 which is adapted, in use, to be connected to the source of pressurised fluid via a corresponding connector on the tractor. A non-return (or one-way) valve 20 is provided in the supply line 16, the non-return valve 20 permitting flow of fluid along the supply line 16 to the emergency apply valve whilst substantially preventing flow of pressurised fluid in the opposite direction from the emergency apply valve to the supply connector 18.

The control port 22d of the emergency apply valve 22 is connected to the supply line 16 upstream of the non-return valve 20, so that the non-return valve 20 is located in the supply line between the emergency apply valve 22 and the connection to the control port 22d.

The control line 24 is connected to a source of a pressurised fluid braking demand signal. When the trailer is pulled by a towing vehicle (tractor) the pressurised fluid braking demand signal typically originates on the tractor and is typically generated by a driver operating a foot pedal provided on the tractor. As such, the control line 24 extends to a pneumatic or hydraulic control connector 26 which is adapted, in use, to be connected to the source of pressurised fluid braking demand signal via a corresponding connector on the tractor. Typically a pressure transducer 28 is provided to measure the fluid pressure in the control line 24.

The modulator valve assembly 14 includes two modulators 14', 14" which are both relay valves operable to move between a build position in which the respective delivery port 14a', 14a" is connected to a supply of pressurised fluid whilst the exhaust port 14c is closed, a hold position in which the three ports 14a'/14a", 14c, and 14d are closed, and an exhaust position in which the delivery port 14a', 14a" is connected to the exhaust port 14c. Each modulator 14', 14" has a control chamber which is connected to the control port 14d and an electrically operable dump valve and hold valve. The modulator 14', 14" is configured such that, when there is no supply of electrical current to either the dump valve or the hold valve, the supply of pressurised fluid to the control chamber causes the modulator 14', 14" to move to the build position until the pressure at the delivery port 14a', 14a" is balanced with the pressure in the control chamber, at which point the modulator 14', 14" moves to the hold position. The pressure supplied to the brake actuators 12a, 12b is thus determined by the pressure at the control port 14d as required for normal service braking.

In this embodiment of the invention, the modulator 14', 14" is configured to move to the hold position when there is supply of electrical current to the hold valve but not to the dump valve, and to move to the exhaust position when there is supply of electrical current to the dump valve and to the hold valve. The modulators 14', 14" could equally be configured to adopt the exhaust position when there is supply of electrical current to the dump valve but not the hold valve.

Various configurations of this type of modulator suitable for use in ABS braking systems are well known to persons of skill in the art.

It will be appreciated that when either of the modulators 14', 14" is in the build position, and when there is a fluid pressure at the control port 14d, this pressurised fluid is transmitted to the respective service brake actuators 12a, 12b (possibly via a separate relay valve), or more precisely a working chamber in the service brake actuators 12a, 12b, and the service brake actuators 12a, 12b are configured to respond to this by actuating a brake to apply a braking force to their respective wheel. Similarly, when either of the modulators 14', 14" is in the exhaust position, pressurised fluid is exhausted from the respective service brake actuators 12a, 12b, or more precisely a working chamber in the service brake actuators 12a, 12b, and the service brake actuators 12a, 12b are configured to respond to this by releasing the braking force. When either of the modulators 14', 14" are in the hold position, fluid pressure in the service brake actuators 12a, 12b is maintained, and so any braking force applied by the actuators 12a, 12b is held at a substantially constant level.

There is an electrically operated brake apply valve 34 provided in the line between the control port 22d of the emergency apply valve 22 and the supply line 16. This valve 34 has an inlet 34a which is connected to the supply line 16, an outlet 34b which is connected to the control port 22d of the emergency apply valve 22, and an exhaust port 34c which vents to a low pressure region, typically the atmosphere. The brake apply valve 34 is movable between a first position (illustrated in FIGS. 1 and 2) in which the inlet 34a is connected to the outlet 34b, and a second position (illustrated in FIG. 3) in which the inlet 34a is closed and the outlet 34b is connected to the exhaust port 34c. The brake apply valve 34 is also provided with a resilient biasing element (a spring) which urges the valve 34 into the first position, and an electrically operable actuator (for example a solenoid or piezoelectric element) which, when supplied with electrical power, causes the valve to move against the biasing force of the spring into the second position.

Finally, the braking system 10 is provided with a pressurised fluid reservoir 30 which is connected to the supply line 16 downstream of the non-return valve 20.

During normal use, no electrical power is supplied to the brake apply valve 34, and the braking system 10 adopts the configuration shown in FIG. 1. Fluid pressure in the supply line 16 causes the emergency apply valve 22 to move against the biasing force of its spring into its first position. Thus, any fluid pressure braking demand signal generated by driver demand for braking flows to the service brake actuators 12a, 12b via the emergency apply valve 22 and the control port 14d of the modulator valve assembly 14. The fluid pressure at the actuators 12a, 12b cause them to move to the brake apply position. A braking force is thus applied to the vehicle.

The braking system 10 is also provided with an electronic braking control unit (ECU) 32 which controls operation of the electrically operable valves in the modulator valve assembly 14. Advantageously, the brake apply valve 34 is electrically connected to the braking ECU 32 so that the braking ECU 32 also controls the supply of electrical power to the electrical actuator of the brake apply valve 34.

At least one wheel speed sensor (not shown) is provided to monitor the speed of a wheel of the trailer, and conventional anti-lock braking algorithms are employed to detect locking of the wheel. If wheel lock is detected, the braking ECU 32 controls the electrically operable valves associated with one or both modulators 14', 14" so that it moves to either the hold position or the exhaust position in accordance with standard ABS control procedures. For example, the electrical power may be momentarily supplied to one or both of the dump valves to release the applied brake pressure, and/or electrical power supplied to one or both of the hold valves to hold the applied brake pressure.

It should be appreciated that, by virtue of the provision of two modulators 14', 14", in this preferred embodiment of the invention, independent ABS control of the braking force applied by each service brake actuator 12a, 12b is possible. The modulator valve assembly 14 could include only one modulator, however, with both service brake actuators 12a, 12b being connected to the delivery port 14a of the modulator. In this case, independent control of the braking force applied by each actuator 12a, 12b would not be possible, and any ABS intervention would be applied equally to both wheels.

If the supply connector 18 becomes disconnected from its connection to the supply of pressurised fluid, the portion of the supply line 16 up-stream of the non-return valve 20 is exhausted to atmosphere. The resulting loss of fluid pressure at the control port 22d of the emergency apply valve 22 causes it to move under the action of its spring to its second position as illustrated in FIG. 2. As a result, the control port 14d of the modulator valve assembly 14 is connected to the trailer pressurised fluid reservoir 30. The pressurised fluid from the reservoir 30 therefore travels to the brake actuators 12a, 12b to apply a braking force to the trailer. In other words, this braking system 10 provides for automatic application of the service brake in the event that the trailer becomes disconnected from its normal supply of pressurised fluid. The braking ECU 32 operates to provide conventional ABS control in the event of wheel slip during this emergency braking.

The braking system 10 may also be operated to apply a braking force to the trailer when the supply line 16 is connected to a supply of pressurised fluid and when there is no driver demand for braking—for example if a stability control system has determined that the stability of the vehicle is compromised and braking of the vehicle is required to improve the stability of the vehicle. To achieve this, electrical power is supplied to the brake apply valve 34. This causes it to move against the biasing force of its spring into its second position as illustrated in FIG. 3. The control port 22d of the emergency apply valve 22 is thus vented to atmosphere, and so the emergency apply valve 22 moves under the influence of its spring to its second position. The control port 14d of the modulator valve assembly 14 is thus connected to the pressurised fluid reservoir 30, and pressurised fluid is supplied to the brake actuators 12a, 12b which applies a braking force to the trailer just as occurs under emergency braking conditions. Again, the braking ECU 32 may be operated, if desired, to provide conventional anti-lock protection to either or both wheels during the braking event.

When braking is no longer required, the supply of electrical power to the brake apply valve 34 is ceased, and the brake apply valve 34 and emergency apply valve 22 move back under the influence of their springs to their first positions as illustrated in FIG. 1. The ECU 32 is programmed to operate the electrically operable valves of the modulator valve assembly 14 to move the modulators 14', 14" to the exhaust position, and thus to vent fluid pressure from the brake actuators 12a, 12b. In this embodiment of the invention, release of the applied brake pressure is achieved by the supply of electrical current to the dump valve and hold valve associated with each modulator 14', 14". The brakes are then released.

The addition of the brake apply valve 34 thus means that the ABS trailer braking system can be used in conjunction with a stability control system without the need to provide full electronic braking system (EBS) control.

An example of a method of vehicle stability control according to the invention, which may be implemented using the braking system described above is as follows.

The vehicle is equipped with at least one accelerometer which is configured to measure the lateral acceleration of the vehicle. The accelerometer is connected to the braking ECU 32, so that the ECU 32 can detect when the vehicle is turning. The ECU 32 is programmed such that when the lateral acceleration of the vehicle ($A_{lat}$) exceeds a predetermined value ($A_{lat.thresh}$), it supplies a pulse of electrical power to the brake apply valve 34. This causes pressurised fluid to be supplied to the brake actuators 12a, 12b via control port 14d of the modulator valve assembly 14 just as described in relation to FIG. 3 above. During this time, the wheel speed sensors are used to measure the speed of each of the braked wheels ($V_a$, $V_b$) and to generate appropriate wheel speed signals.

It is desired that the test braking pulse applies only a relatively low level of braking force to the braked wheels, such that the test braking would not have any appreciable effect on the speed of a wheel travelling on a relatively high friction surface and in good contact with the road surface, but would cause a significant reduction in the speed of a wheel which has partially or fully lifted off the road surface. It should be appreciated that the supply of electrical power to the brake apply valve 34 causes the control port 14d of the modulator valve assembly 14 to be connected to fluid at reservoir pressure, and this could result in maximum braking force being applied to the braked wheels. This is not what is required for the test braking pulse, and so the ECU 32 is programmed to switch on the hold valves (to hold the braking pressure) after a short period of time, the period of time having been predetermined to be sufficient to allow the pressure in the control chamber of the modulator valve assembly 14 to build up to an appropriate level to apply a low level braking force to the braked wheels. It will be appreciated that the control line between the emergency apply valve 22 and the control port 14d will continue to increase to the available reservoir pressure, whilst the control port 14d is closed.

The ECU 32 then, after a further short period of time, ends the test braking pulse by supplying electrical power to the dump valves of the modulators 14', 14" to release the braking pressure. The hold valves may remain energised until such time as the ECU is ready to switch off the electrical power supply to the brake apply valve 34 and exhaust the control line, as will be discussed further below.

The exact level of pressure reached at the control port 14d after electrical power has been supplied to the brake apply valve 34 and the hold valve energised after a predetermined period of time is difficult, if not impossible to determine, however, as it depends on various factors including the reservoir pressure and temperature of the system. Thus, whilst the aim is to apply a low level braking force which will only affect a lifting wheel or wheels, it is possible that, in reality, the braking force is actually a little higher than desired. A higher level of test braking force may have an effect on the velocity of a non-lifting wheel or wheels including the wheels on the outside of the vehicle's turning curve, particularly if the wheel or wheels in question are travelling on a lower friction surface than expected on a dry paved road (the road may be damp for example). If this occurs, simply monitoring the speed of the wheels on the inside of the turning curve, as in the prior art systems, may not give an accurate assessment of the stability situation, and may result in a stability control intervention being carried when none is required.

As such, in the inventive method, the presence of wheel lift is detected by comparison of the effect of the test braking pulse on a wheel on a first side of the vehicle with the effect of the test braking pulse on a wheel on a second side of the vehicle. Specifically, in this example, the ECU 32 is programmed to calculate the change in wheel speed during the test braking pulse for each of the braked wheels ($\Delta V_a$, $\Delta V_b$), and then to calculate the magnitude of the difference between the change in wheel speed for the braked wheel at the first side of the vehicle and the change in wheel speed for the braked wheel at the second side of the vehicle. The ECU 32 then compares this difference with a predetermined threshold difference ($\Delta V_{diff}$). If the difference is low, then any change in wheel speed during the test braking is happening on both sides of the vehicle, and therefore can be attributed to deceleration of the vehicle, or if the vehicle is travelling on a low friction surface, wheel slip, resulting from the application of a higher than ideal level of braking force during the test braking. If the difference is large, it is likely that the greater change in wheel speed on one side of the vehicle only can be attributed to lifting of the wheel on that side of the vehicle.

If the difference is less than the threshold difference, it is assumed that there is no wheel lift, and so no intervention is required. The ECU 32 is programmed to switch off the electrical power supply to the brake apply valve 34, and then to operate the modulators 14', 14" to return them to the build position (in this example, by switching off electrical power supply to the dump and hold valves). The portion of the control line 24 between the control port 14d of the modulator valve assembly 14 and the emergency apply valve 22 is then connected to the tractor via the portion of the control line 24 between the tractor and the emergency apply valve 22, and vents to atmosphere at the tractor.

If the difference is greater than the threshold difference, the ECU 32 is programmed to initiate a stability control intervention. In this embodiment of the invention, if wheel lift is detected, the ECU 32 is programmed to initiate a stability control braking intervention, and to return the modulators 14', 14" to the build position (by switching off the supply electrical power to the dump and hold valves) so that the brake actuators 12a, 12b apply a braking force to their respective wheels and slow the vehicle down, hence reducing the likelihood of rollover. It will be appreciated, however, that the control intervention could comprise other means of reducing the vehicle speed, such as throttling the vehicle engine. Alternatively, if wheel lift is detected, the central ECU may be programmed to generate a rollover alarm signal, which may comprises an audible or visual alarm or both, to alert the driver that braking is required to reduce the vehicle speed, and hence avoid rollover.

This process is illustrated in the flow chart attached as FIG. 4.

Whilst the braking force may be applied by both service brake actuators 12a, 12b, i.e. to the wheels on both sides of the vehicle, in a preferred embodiment of the invention, the ECU 32 is programmed to determine the direction of turning of the vehicle from the lateral acceleration signal, and to supply electrical power to the dump and/or hold valve controlling the modulator 14', 14" associated with the wheel on the inside of the turn (i.e. the lifting wheel) to move that modulator 14', 14" to the exhaust and/or hold position. As a result of this, no braking force is applied to the wheel on the inside of the turning curve.

Also, in this embodiment of the invention, the ECU 32 is programmed to monitor the lateral acceleration of the vehicle during the stability control intervention, and to move the active modulator(s) 14', 14" to the exhaust position (in this example by switching on electrical power to the hold and dump valve(s)), thus releasing the brake pressure, when the lateral acceleration ($A_{lat}$) falls below a second threshold lateral acceleration ($A_{lat.thresh2}$) which may be equal to or different from the threshold lateral acceleration ($A_{lat.thresh}$) used prior to initiating the test braking. $A_{lat.thresh2}$ may, for example, be set as a predetermined percentage of the lateral acceleration $A_{lat}$ detected just prior to initiation of the test braking. The electrical power supply to the brake apply valve 34 may then be switched off to connect the portion of the control line 24 between the control port 14d of the modulator valve assembly 14 and the emergency apply valve 22 to the tractor via the portion of the control line 24 between the tractor and the emergency apply valve 22 (thus exhausting the control line 24). The ECU 32 is then programmed to return the modulators 14', 14" to the build position, in this example by switching off the power supply to the dump and hold valves.

The ECU 32 is preferably programmed to carry out the normal ABS monitoring and control procedures during the stability control braking intervention, i.e. to release/hold the braking pressure in accordance with conventional ABS algorithms if wheel slip is detected.

The further short period of time (i.e. the time after which the test braking pressure is released) may be fixed, but, in a preferred embodiment of the invention, the ECU 32 is programmed such that it is variable depending on the initial reaction of the wheel speeds on the two sides. For example, if an equal test pulse pressure on both sides of the vehicle causes an equal reaction on both sides even though the vehicle is cornering with relatively high lateral acceleration, the vehicle may be unladen or the road may be damp. In these cases, it is much less likely that the vehicle will roll, so the test pressure need not be applied for very long. If, however, the inside wheels show a greater reaction than the outer wheels then the test pressure may be applied for longer to see if a wheel lift condition develops. The ECU 32 may therefore be programmed such to terminate the test braking pulse if it is determined that the difference in wheel speed after a predetermined length of time (say 200 ms) is below a predetermined threshold level, or to continue the test braking pulse for a while longer (say up to 600 ms) if it is determined that the difference in wheel speed after a predetermined length of time is above a predetermined threshold level.

Although not essential, in this embodiment of the invention, a pressure sensor 28 is provided in the control line 24, and is electrically connected to the ECU 32, so that the pressure sensor 28 can transmit to the ECU 32 an electrical signal representative of the fluid pressure in the control line 24. It will be appreciated that, if there is driver demand for braking, the fluid pressure in the control line 24 will increase to a level indicative of the level of braking force required. The ECU 32 is programmed to monitor that signal, and if there is driver demand for braking (detected by the pressure sensor 28 as an increase in fluid pressure in the control line 24) during a test braking pulse, to determine if the level braking force demanded by the driver is lower or higher than the test braking pulse level. If it is lower, the ECU 32 is programmed to continue with the test pulse. If it is higher, however, the ECU 32 is programmed to operate the modulators 14', 14" to hold the test braking pressure (in this example by the supply of electrical power to the hold valves) whilst de-energising the brake apply valve 34. This connects the control port 14d to the control line 24, and allows the excess pressure in the control line between the control port 14d and the emergency apply valve 22 to dissipate along the entire length of the control line 24 to the towing vehicle. The braking demand pressure is therefore supplied to the control port 14d.

The ECU 32 then de-energises the hold valves so that the braking demand pressure in the control line 24 is passed to the brake actuators 12a, 12b via the modulators 14', 14". The test braking pressure is therefore increased to the level of braking demand set by the driver.

The ECU 32 may be programmed to carry out the same monitoring of the wheel speeds as it does during a normal test braking pulse. It may, however, be programmed to cease this monitoring, and therefore to treat the braking as a normal driver demanded braking event, if the driver demand exceeds a predetermined level. If the braking system is provided with a load sensor which transmits a signal representative of the vehicle load to the ECU 32, this predetermined level may be load dependent.

If the ECU 32 determines that, despite the driver demand for braking, there is wheel lift, full reservoir pressure will be applied to the brake associated with the wheel on the outside of the turn only (i.e. the non-lifting wheel) just as described above, as long as the ECU 32 determines that the resulting overall braking effect is more than that achievable by simply allowing the driver demanded brake pressure to continue to all wheels.

If the system is demanding stability control braking but we are allowing driver demanded braking instead, should the level of driver demanded braking reduce then we can switch from driver demand to autonomous braking again by re-energising the brake apply valve 34.

In one embodiment of the invention, in order to conserve air, and make the system more responsive, the ECU 32 is programmed such that the brake apply valve 34 and the dump and hold valves remain active for a brief period of time (say 2.5 seconds) after the end of the test pulse or the controlling brake pressure application, rather than exhausting the control line between the emergency apply valve 22 and the modulator valve assembly 14 straight away every time. The driver demand pressure is continuously monitored in this case and should it exceed a threshold level, the system will allow the driver demand pressure through by switching off power to the brake apply valve 34 and then the hold and dump valves soon afterwards.

If the driver is already braking when the ECU 32 determines that a test braking pulse is required, if the driver is braking at a level lower that the nominal test pulse level, the test pulse is initiated as described above, but the ECU 32 may be programmed such that the time period for which the brake apply valve 34 is energised before the hold valves are energized is adjusted to take into account the existing brake pressure. This reduces the likelihood of unwanted control interventions or driver annoyance due to unwanted low-level retardation of the vehicle.

Various modifications may be made to the braking system whilst operating the method according to the invention.

The ECU 32 may be programmed to use the lateral acceleration signal to determine which way the vehicle is turning, and to calculate $\Delta V_{diff}$ by subtracting the speed change of the wheel at the outside of the turn from the speed change of the wheel at the inside of the turn.

The ECU 32 may be programmed to deactivate its normal ABS functionality during test braking.

As mentioned above, the braking system 10 may be provided with more than two actuators 12a, 12b. In this case the ECU 32 can be programmed to calculate $\Delta V_{diff}$ for each pair of wheels (a pair comprising one wheel on the first side of the vehicle and one wheel on the second side of the vehicle) and to initiate a stability control intervention if the $\Delta V_{diff}$ exceeds the threshold level for any of the wheel pairs. Alternatively, it may be programmed to only carry out the comparison for one predetermined pair of wheels.

If the braking system 10 does include more than two actuators 12a, 12b, the ECU is preferably programmed such that, during a stability control braking intervention, the electrically operable ABS control valves are controlled to exhaust the pressure from the actuators associated with wheels on the inside of the turn, so that braking is carried out by all actuators associated with wheels on the outside of the turn.

If the braking system is provided with a load sensor which transmits a signal representative of the vehicle load to the ECU 32, the ECU 32 may be programmed to make test braking pressure dependent on the vehicle load to optimise the braking level for detection of lifting wheels whilst reducing the likelihood of unwanted control interventions or driver annoyance due to unwanted low-level retardation of the vehicle.

When used in this specification and claims, the term "line" covers any type of conduit for pressurised fluid including a passage or bore through a housing, a hose, pipe or tube. It should also be appreciated that, whilst in this example, the modulator valve assembly 14 may be connected to more than one brake actuator.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of vehicle stability control including the steps of:
   a) applying a test braking pulse to a wheel on a first side of the vehicle and to a wheel on a second, opposite, side of the vehicle,
   b) measuring the rotational speed of both wheels during the test braking pulse,
   c) calculating a change in wheel speed during the test braking pulse for each wheel,
   d) calculating the difference between the change in speed of the wheel at the first side of the vehicle and the change in speed of the wheel at the second side of the vehicle from the start of the test braking pulse for a first period of time,
   e) carrying out a stability control intervention if the difference exceeds a predetermined threshold,
   f) ceasing the test braking pulse if the difference over the first period of time is less than a predetermined level, and
   g) continuing the test braking pulse for a second period of time if the difference over the first period of time is greater than the predetermined level.

2. A method of vehicle stability control according to claim 1 wherein the method further comprises the steps of measuring the lateral acceleration of the vehicle, and carrying out the steps a to e of claim 1 if the lateral acceleration of the vehicle exceeds a predetermined threshold.

3. A method of vehicle stability control according to claim 1 wherein the stability control intervention comprises applying a controlled braking force to one or more of the wheels on the outside of the vehicle's turning curve.

4. A method of vehicle stability control according to claim 1 wherein the method further comprises the steps of measuring the lateral acceleration of the vehicle and ceasing the braking stability control intervention when the lateral acceleration of the vehicle falls below a predetermined threshold.

5. A method of vehicle stability control according to claim 1 wherein the method further comprises the steps of monitoring the braking system to detect if there is driver demand for braking during the test braking pulse, determining the level of braking demanded, comparing this with the level of braking applied as the test braking pulse, and, if the level of braking demanded exceeds the test braking level, increasing the level of braking applied to meet the level demanded.

6. A method of vehicle stability control according to claim 3 wherein the method further comprises the steps of monitoring the braking system to detect if there is driver demand for braking, and if there is driver demand for braking during the stability control intervention, determining the level of braking demanded, comparing this with the level of braking applied as the stability control intervention, and, if the level of braking demanded exceeds the level applied in the stability control intervention, applying the demanded level of braking pressure to all wheels of the vehicle.

7. A method of vehicle stability control according to claim 1 wherein, where the test braking pulse is continued for the second period of time, the difference used in step e of the method is the difference between the change in speed of the wheel at the first side of the vehicle and the change in speed of the wheel at the second side of the vehicle over the first and second periods of time.

8. A vehicle braking system comprising an electronic braking controller which is programmed to implement a method of vehicle stability control including the steps of:
   a) applying a test braking pulse to a wheel on a first side of the vehicle and to a wheel on a second, opposite, side of the vehicle,
   b) measuring the rotational speed of both wheels during the test braking pulse,
   c) calculating a change in wheel speed during the test braking pulse for each wheel,
   d) calculating the difference between the change in speed of the wheel at the first side of the vehicle and the change in speed of the wheel at the second side of the vehicle from the start of the test braking pulse for a first period of time,
   e) carrying out a stability control intervention if the difference exceeds a predetermined threshold
   f) ceasing the test braking pulse if the difference over the first period of time is less than a predetermined level, and
   g) continuing the test braking pulse for a second period of time if the difference over the first period of time is greater than a predetermined level.

9. A vehicle braking system according to claim 8 further including a lateral accelerometer, and wherein the electronic braking controller is programmed to use the lateral accelerometer to determine the lateral acceleration of the vehicle, and to carry out the steps a to e of claim 8 if the lateral acceleration of the vehicle exceeds a predetermined threshold.

10. A vehicle braking system according to claim 8 wherein the stability control intervention comprises applying a controlled braking force to one or more of the wheels on the outside of the vehicle's turning curve.

11. A vehicle braking system according to claim 8 further including a lateral accelerometer, and wherein the electronic braking controller is programmed to use the lateral accelerometer to determine the lateral acceleration of the vehicle and cease the braking stability control intervention when the lateral acceleration of the vehicle falls below a predetermined threshold.

12. A vehicle braking system according to claim 8 wherein the electronic braking controller is further programmed to monitor the braking system to detect if there is driver demand for braking during the test braking pulse, determine the level of braking demanded, compare this with the level of braking applied as the test braking pulse, and, if the level of braking demanded exceeds the test braking level, increase the level of braking applied to meet the level demanded.

13. A vehicle braking system according to claim 8 wherein the electronic braking controller is further programmed to monitor the braking system to detect if there is driver demand for braking, and if there is driver demand for braking during the stability control intervention, determine the level of braking demanded, compare this with the level of braking applied as the stability control intervention, and, if the level of braking demanded exceeds the level applied in the stability control intervention, apply the demanded level of braking pressure to all wheels of the vehicle.

14. A vehicle braking system according to claim 8 wherein the electronic braking controller is further programmed to continue the test braking pulse for the second period of time, the difference used in step e of the method being the difference between the change in speed of the wheel at the first side of the vehicle and the change in speed of the wheel at the second side of the vehicle over the first and second periods of time.

\* \* \* \* \*